(12) United States Patent
Gitschel (10) Patent No.: US 9,713,812 B1
(45) Date of Patent: *Jul. 25, 2017

(54) METHODS AND SYSTEMS FOR SEPARATING AND RECOVERING RECYCLABLES USING A COMMINUTION DEVICE

(75) Inventor: George Gitschel, Sugar Land, TX (US)

(73) Assignee: ORGANIC ENERGY CORPORATION, Sugar Land, TX (US)

( * ) Notice: Subject to any disclaimer, the term of this patent is extended or adjusted under 35 U.S.C. 154(b) by 1023 days.

This patent is subject to a terminal disclaimer.

(21) Appl. No.: 13/612,037

(22) Filed: Sep. 12, 2012

Related U.S. Application Data (60) Provisional application No. 61/533,528, filed on Sep. 12, 2011.

(51) Int. Cl.
*B02C 23/14* (2006.01)

(52) U.S. Cl.
CPC ................... *B02C 23/14* (2013.01)

(58) Field of Classification Search
CPC ........... B03D 1/02; B03B 9/061; B03B 9/005; B03C 1/005; B29B 17/02; B02C 25/00; B02C 23/14
USPC ....... 241/19, 20, 24.13, 24.14, 24.18, 24.19, 241/38, 79, 79.1, 30
See application file for complete search history.

(56) References Cited

U.S. PATENT DOCUMENTS

| | | |
|---|---|---|
| 3,524,594 A | 8/1970 | Anderson et al. |
| 4,063,903 A | 12/1977 | Beningson et al. |
| 4,065,282 A | 12/1977 | Morey |
| 4,077,847 A | 3/1978 | Choi et al. |
| 4,264,352 A * | 4/1981 | Houser ............... B03B 9/06 209/11 |
| 4,844,351 A | 7/1989 | Holloway |
| 4,874,134 A | 10/1989 | Wiens |
| 5,025,929 A | 6/1991 | Carrera et al. |
| 5,100,066 A | 3/1992 | Frei |

(Continued)

FOREIGN PATENT DOCUMENTS

| | | |
|---|---|---|
| CN | 1209794 | 3/1999 |
| CN | 1511654 | 7/2004 |

(Continued)

OTHER PUBLICATIONS

Nihot Recycling Technology B.V., "Nihot Drum Separator", 2 pages, (date unknown), Amsterdam, The Netherlands, http://www.nihot.co.uk/fileadmin/nihot/pdf/Nihot_Single_Drum_Separator_01_2011_ENG.pdf, website accessed on Sep. 9, 2013.

(Continued)

*Primary Examiner* — Mark Rosenbaum
(74) *Attorney, Agent, or Firm* — Workman Nydegger (57) ABSTRACT

Methods and systems for mining or recovering high value recyclable materials from waste streams with high percentages of recyclable materials. Examples of waste streams that can be advantageously processed using the methods and systems herein include dry commercial solid waste, dry industrial solid waste, and/or source separated curbside collected and processed single stream waste. The methods utilize a shredder to improve the efficiency and recovery rate of recyclables. Some methods also include upgrading an existing waste processing facility to include a shredder.

20 Claims, 6 Drawing Sheets

(56) References Cited

U.S. PATENT DOCUMENTS

| | | |
|---|---|---|
| 5,184,780 A | 2/1993 | Wiens |
| 5,361,909 A | 11/1994 | Gemmer et al. |
| 5,465,847 A | 11/1995 | Gilmore |
| 5,649,785 A | 7/1997 | Djerf et al. |
| 5,902,976 A * | 5/1999 | Beasley .................. 209/164 |
| 6,024,226 A | 2/2000 | Olivier |
| 6,117,671 A | 9/2000 | Yilmaz |
| 6,136,590 A | 10/2000 | Kruse |
| 6,168,642 B1 | 1/2001 | Valkanas et al. |
| 6,199,779 B1 | 3/2001 | Mosher |
| 6,299,082 B1 | 10/2001 | Smith |
| 6,379,527 B1 | 4/2002 | Vogt et al. |
| 6,467,708 B1 * | 10/2002 | Terzini et al. .................. 241/23 |
| 6,903,294 B1 | 6/2005 | Daiku et al. |
| 6,911,149 B2 | 6/2005 | Hansen et al. |
| 7,290,669 B1 | 11/2007 | Hansen et al. |
| 7,431,229 B2 | 10/2008 | Gali |
| 7,452,467 B2 | 11/2008 | Hansen et al. |
| 7,615,155 B1 | 11/2009 | Hansen et al. |
| 7,767,924 B2 | 8/2010 | Jeon et al. |
| 7,810,646 B2 | 10/2010 | Miller et al. |
| 7,832,670 B2 | 11/2010 | Peterson et al. |
| 7,942,273 B2 | 5/2011 | Campbell et al. |
| 7,955,839 B2 | 6/2011 | Choate et al. |
| 8,307,987 B2 | 11/2012 | Miller et al. |
| 8,322,639 B2 | 12/2012 | Gitschel |
| 8,393,558 B2 | 3/2013 | Gitschel |
| 8,398,006 B2 | 3/2013 | Gitschel |
| 2002/0184816 A1 | 12/2002 | Philipson |
| 2006/0001187 A1 | 1/2006 | Allen III et al. |
| 2006/0081513 A1 | 4/2006 | Kenny |
| 2007/0117195 A1 | 5/2007 | Warner et al. |
| 2008/0020456 A1 | 1/2008 | Choate et al. |
| 2008/0169231 A1 | 7/2008 | Hansen et al. |
| 2008/0236042 A1 | 10/2008 | Summerlin |
| 2009/0008298 A1 | 1/2009 | Studley |
| 2009/0032442 A1 | 2/2009 | Singh et al. |
| 2009/0152173 A1 | 6/2009 | Miller et al. |
| 2010/0201026 A1 | 8/2010 | Dvorak et al. |

FOREIGN PATENT DOCUMENTS

| | | |
|---|---|---|
| CN | 1795055 | 6/2006 |
| CN | 1898023 | 1/2007 |
| CN | 101618392 | 1/2010 |
| EP | 0099261 | 1/1984 |
| EP | 0123355 | 10/1984 |
| JP | 2000-277112 | 10/2000 |
| JP | 2000-347357 | 12/2000 |
| JP | 2001-079493 | 3/2001 |
| JP | 2002-210448 | 7/2002 |
| JP | 2002-316097 | 10/2002 |
| JP | 2002-326058 | 11/2002 |
| JP | 2003-001298 | 1/2003 |
| JP | 2003-094438 | 4/2003 |
| JP | 2003-260414 | 9/2003 |
| JP | 2004-113900 | 4/2004 |
| JP | 2005-121587 | 5/2005 |
| JP | 2005-199132 | 7/2005 |
| JP | 2005-288209 | 10/2005 |
| JP | 2006-150361 | 6/2006 |
| JP | 2006-289332 | 10/2006 |
| JP | 2006-314912 | 11/2006 |
| JP | 2008-013698 | 1/2008 |
| JP | 2008-506517 | 3/2008 |
| JP | 2008-132408 | 6/2008 |
| KR | 10-1999-0003753 | 1/1999 |
| KR | 10-0517663 | 9/2005 |
| KR | 2006-0059919 | 6/2006 |
| KR | 10-0665251 | 1/2007 |
| WO | WO 2006/017282 | 2/2006 |

OTHER PUBLICATIONS

F De Poli: "Energy Recovery From Mixed Fraction of MSW Through Pressure Separation and Anaerobic Digestion of the Wet Material", 7 pages, Proceedings Venice, Jan. 1, 2008 (Jan. 1, 2001), XP055173456, Retrieved from the internet: URL: http://www.vmpress.it/documenti/ENERGY Recovery From Mixed Fraction From MSW Through Pressure Separation and Anaerobic Digestion of the Wet Material.pdf [retrieved on Mar. 3, 2015].

* cited by examiner

METHODS AND SYSTEMS FOR SEPARATING AND RECOVERING RECYCLABLES USING A COMMINUTION DEVICE

CROSS-REFERENCE TO RELATED APPLICATIONS

This Application claims the benefit of U.S. Provisional application 61/533,528 filed Sep. 12, 2011, titled "Methods and Systems For Separating and Recovering Recyclables Using a Comminution Device," which is hereby incorporated herein by reference.

BACKGROUND OF THE INVENTION

1. The Field of the Invention

The present invention relates to systems and methods for recovering recyclable materials from solid waste streams such, but not limited to, municipal solid waste.

2. The Related Technology

Commercial, industrial, and residential consumers generate large amounts of throw-away and waste products (i.e., municipal solid waste) that need to be handled and disposed of in an environmentally satisfactory manner. Municipal Solid Waste (hereinafter "MSW") contains many valuable resources that can be recycled and made into new products. While many communities have instituted recycling collection and processing programs for residential, commercial and industrial generated MSW, the overall recycling rate for the United States remains rather low at 33%, according to the US EPA. A significant percentage of these valuable recyclable resources have been disposed of by landfilling or incineration. Traditional source separated collection of residential, commercial and industrial recyclables is expensive and largely ineffective from a diversion perspective. Furthermore, the additional collection truck routes generate additional pollution. Landfilling and/or incinerating valuable resources is wasteful and these methods of waste and recyclable product disposal contaminate the soil, water and air. Environmental restrictions as well as land usage demands for housing have reduced the number of sites available for landfills and incinerators.

In response, governments and the public have demanded that, wherever possible, recycling systems should be employed to conserve material resources and to reduce pollution problems. Efforts have been made to recover valuable resources such as glass, plastic, paper, aluminum, and ferrous and non-ferrous metals from waste materials. For example, households in many cities are asked to sort their garbage into recyclables (e.g., paper, plastic containers, metal containers and glass containers) and non-recyclables. However, rates of non-compliance and mis-compliance are high. Some people fail to sort their waste at all and others sort it incorrectly, which either shunts recoverable materials into the waste stream or contaminates the recyclable stream with waste materials. Non-compliance and mis-compliance reduce the efficiency of and increases the costs associated with operating recycling systems designed to processed pre-sorted waste. Furthermore extra recyclable collection routes are costly and cause additional pollution.

Commercial and Industrial recycling is very limited due to difficulty in dedicating the necessary space for storing containers to hold the individual recyclable commodities. There is limited amount of dry commercial and industrial mixed waste recycling programs that are available. However the commercial and industrial recyclable recovery and processing systems are labor intensive, inefficient and costly to operate.

Some recycling systems attempt to avoid the problems with presorted waste by attempting to recover recyclable materials from mixed waste. However, many of these systems are fraught with the tendency to be highly labor intensive to operate, while offering relatively low recovery rates of recyclables.

The energy balance of many recycling systems is sub-par or, in some cases, negative. Some recycling systems are so inefficient that the processes of recovering, transporting, and recycling the recyclable materials consumes more energy than could be saved by simply landfilling the garbage and making new products from raw materials. In other cases so little of the recyclable materials are recovered that the problems with waste stream disposal go essentially unmitigated.

SUMMARY

The present disclosure relates to methods and systems for mining or recovering high value recyclable materials from waste streams with high percentages of recyclable materials. Examples of waste streams that can be advantageously processed using the methods and systems herein include dry commercial solid waste, dry industrial solid waste, and/or source separated curbside collected and processed single stream recyclable materials. In the methods and systems of the invention, the waste streams are comminuted (i.e., shred or ground) prior to separation. The grinding or shredding produces an intermediate waste stream with a desired particle size distribution that facilitates proper separation and recovery of recyclable materials using a plurality of different sorting apparatuses. The ground or shredded particles have a more uniform and proper size for the sorting apparatuses to select between different sized materials. In some embodiments, the ground or shredded waste can also be fractionated using a density separator to further enhance the separation of different recyclable materials and produce individual intermediate stream enriched in particular recyclable materials.

The systems and methods described herein can be used to more efficiently recover recyclable products from waste materials with a high percentage of recyclable materials. The efficient recovery of the individual materials with higher purity allows the recyclable materials to be used and/or recycled as high value products. The current practice in many existing recycling facilities is to recover only a portion of the material as high value recyclables and a relatively large portion of the material is used as a refuse derived fuel (i.e., incinerated or burned). While incineration is more useful than landfilling, it is still a very inefficient use of resources. The methods and systems can substantially improve the yield, improve the value, and/or reduce the cost of extracting recyclables from waste streams such as dry commercial waste, dry industrial waste, and residential source separated recyclable materials.

The present invention also relates to methods for upgrading a waste processing facility to improve the efficiency of the facility and/or to extract more or larger percentages of recyclable materials from a waste stream. The method includes (i) providing a recycling facility that includes an established waste processing line. The established waste processing line has a plurality of size separating apparatuses that fractionate waste by size and dimension (e.g., 2-dimensional and 3-dimensional) and a plurality of sorting apparatuses that sort recyclable materials into recyclable products. The established waste processing line is configured to and has been operated to recover recyclable products from a dry commercial solid waste stream, a dry industry solid waste stream, and/or a source separated residential recyclable solid waste stream; (ii) upgrading the established waste processing line to newly include a shredder or grinder upstream from the plurality of sorting apparatuses thereby yielding an upgraded waste processing line; and (iii) processing a recyclable waste stream on the upgraded waste processing line, where the recyclable waste stream includes a dry commercial solid waste stream, a dry industry solid waste stream, and/or a source separated residential recyclable material stream, and the processing includes shredding and/or grinding the recyclable material stream.

Upgrading an exiting waste processing facility to include a shredder or grinder and optionally one or more density separators allows a plant that has been producing a substantial quantity of refuse derive fuel or landfilled waste residue to reduce the production of refuse derived fuel or landfilled waste residue in favor of producing recyclable products that are more valuable and represent a better utilization of natural resources.

These and other features of the embodiments disclosed herein will become more fully apparent from the following description and appended claims.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

I. Methods for Mining Recyclables from Solid Waste Streams

Figure 1:
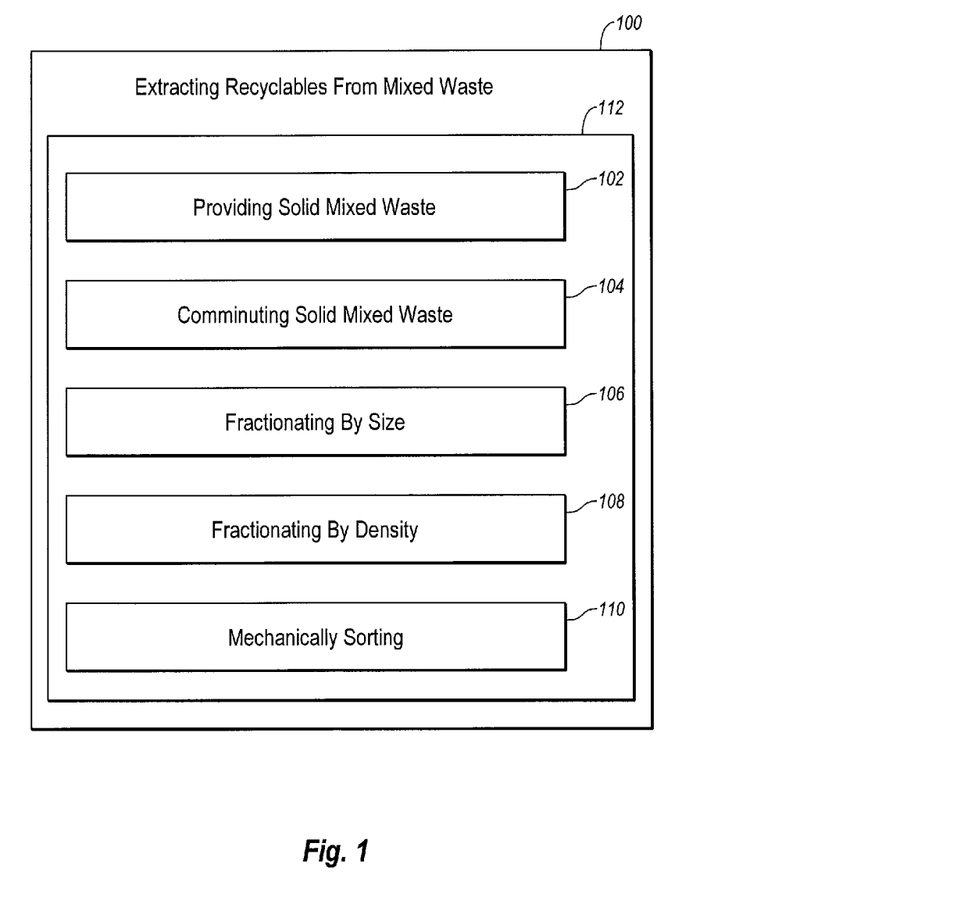
FIG. 1 is a flow diagram illustrating methods for recovering recyclable materials from a recyclable mixed solid waste stream.

FIG. 1 illustrates an example method 100 for recovering recyclable materials from a recyclable mixed solid waste stream. In one embodiment, method 100 includes all or a portion of the following steps: (i) in a first step 102, providing a mixed waste stream including recyclable materials such as paper, plastic, and metal (particularly non-ferrous metal); (ii) in a second step 104, comminuting the mixed waste stream; (iii) in a third step 106 fractionating the mixed waste stream by size to produce a plurality of sized waste streams; (iv) in a fourth step 108, fractionating at least a portion of the sized waste streams by density to produce a plurality of intermediate waste streams individually enriched in one or more of the recyclable materials; (v) in a fifth step 110, individually sorting the plurality of intermediate waste streams using one or more sorting apparatuses to produce recyclable products such as, but not limited to recycled paper products, recycled plastic products, and/or recycled metal products. Optionally the method can include metering 112 and/or spreading the sized waste streams throughout any or all portions of process 100 to control mass flow and/or burden depth.

In the present disclosure, a number of comminuting and/or size fractionation steps are described with respect to methods and systems for the separation of solid waste. Typically each of these steps has an associated size cut-off. Persons having skill in the art will appreciate that fractionated materials typically exhibit a distribution of particles. The distribution will often include an insignificant number of particles above or below the cut-off. Unless otherwise specified, an upper cut-off number (e.g., 16" or less, 12" or less, 8" or less, the upper range of an 8" to 2" over fraction) generally means that about 90% of the particles in the fraction (i.e., the distribution) have a size of less than the cut-off number, while about 10% of the particles in the fraction will be larger than the upper cut-off size. Unless otherwise specified, a lower cut-off number (e.g., the lower range of an 8" to 2" over fraction) generally means that about 90% of the particles in the fraction have a size of larger than the cut-off number, while about 10% of the particles in the fraction are smaller than the lower cut-off size. In alternative embodiments, upper cut-off number can include 95% or 99% of the of the particles in the fraction and/or the bottom cut can include less than 5% or less than 1% of the particles in the fraction.

1. Providing Solid Waste Stream

The waste streams utilized in the methods and systems described herein include a mixture of different types of solid materials. The waste streams include recyclable materials that upon separation from other types of recyclable material or refuse can be utilized and therefore have value. In one embodiment, the recyclable mixed solid material may be (i) a source separated residential recyclable solid materials stream, (ii) a dry commercial solid waste stream, (ii) a dry industrial solid waste stream, and/or (iii).

Source separated waste is waste that is separated at the time of disposal. Source separated waste is typically highly concentrated in recyclable materials because the producer of the waste has selectively disposed of the recyclable materials into a designated container or disposal location. Source separated waste may be commercial waste, industrial waste, or residential waste. Residential source separated recyclables are commonly collected in "blue bin containers" and is sometimes referred to as "blue bin waste" or "single stream recyclables" when in single stream configurations which allow all residential recyclables (e.g., cardboard, newspaper, mixed paper, aluminum cans, tin cans, ferrous metals, PETE plastic containers, HDPE plastic containers, mixed plastics, glass) to be placed in a single collection bin and/or container.

Residential source separated recyclables are often enriched in cardboard, mixed paper, newspaper, 1-7 plastics, aluminum cans, metal cans, and the like. If a glass recycling facility is within reasonable distance of the waste facility, the source separated recyclables may include glass containers. Residential source separated recyclables typically also possess between 5% to 35% of non-recyclable contaminates or residue or garbage.

Dry commercial solid waste may be a mixed waste and/or a source separated waste derived from commercial establishments that tend to produce little wet organic waste. Examples include waste that is collected from office buildings, businesses, warehouses, and the like. Often times commercial establishments that produce large quantities of wet organics will be collected separate from dry commercial waste to ensure a high percentage of dry recyclable materials. Most dry commercial waste includes some wet organics, but the amount of wet organic is sufficiently limited to make it unnecessary to separate the wet organics from the dry waste and the amount of wet organics does not materially reduce the value of dry products produced from the waste stream.

Dry commercial waste will often include a substantial amount of one or more of the following materials: packaging materials, plastic shrink wrap, cardboard, pallets, wood, mixed paper, Styrofoam, PETE containers, PETE strapping, ferrous metals, non-ferrous metals, aluminum cans, glass and the like.

Dry industrial waste is waste produced from industrial establishments such as heavy and light manufacturing sites. Dry industrial waste is often similar to dry commercial waste, but is typically more enriched in large boards such as pallets, wood beams (e.g., 2×4s), crates, heavier metals and generally bulkier items. Dry industrial waste may be processed alone or in combination with commercial waste and may be collected on the same or a different pickup route as dry commercial waste.

The foregoing waste streams contain a number of components that only have value as a recyclable material when separated from other components. Recyclable materials such as plastics; fiber materials, including paper and cardboard; metals, including ferrous metals and non-ferrous metals such as brass and aluminum; glass; textiles; rubber; electronic waste; and wood have substantially greater value when separated from one another with sufficient purity to be utilized as a recyclable material.

While even small percentages of these materials may be valuable, separating the recyclables from each other and other components in mixed solid waste streams is extremely challenging. This is especially true when two, three, four, or more different types of recyclables need to be separated and recovered. Even though source separated waste, dry commercial waste, and dry industrial waste tend to have low amounts of wet organic waste, the separation of the recyclable materials into individual streams can still be very challenging.

The foregoing waste streams have a high percentage of recyclable materials. In one embodiment the percentage of recyclables is at least 30 wt %, 40 wt %, 50 wt %, 60%, 70 wt %, 80 wt %, 90 wt % and/or 95 wt %. Preferably the waste stream includes 1, 2, 3, or more high value materials including, but not limited to one or more of paper, plastic and non-ferrous material.

The dry commercial and industrial waste streams, as well as the residential source separated recyclable materials are generally low in wet organic waste. The wet organic content can be less than 25 wt %, 20 wt %, 15 wt %, 10 wt %, or even less than 5 wt %.

Wet organics may include food and kitchen waste; green waste, such as yard clippings, plants, vegetation, branches, and the like; and inorganic wastes, such as concrete, dirt, rocks, and debris.

The methods and systems describe herein include providing a mixed solid waste stream that includes at least one recyclable material, preferably at least two, and more preferably at least 3 different types of recyclable materials. In one embodiment, the waste stream includes at least two materials selected from the group of paper, plastic and metal. Preferably, the mixed waste stream includes paper, plastics, and metals.

The amount of recyclable materials in the stream, the percentage of the recyclable material recovered, and the value of the recycled material have a significant impact on the economic viability of extracting the recyclable materials through mechanized sorting (larger values being more desirable).

In one embodiment, the mixed waste stream may include at least 0.5%, 1%, 2%, 3%, 4%, 5% or more of a recyclable metal or less than 30%, 20%, 15%, 10%, or 5% (by weight) or a range of any of the forgoing upper and lower weight percentages of recyclable metal material.

The mixed waste stream may include at least 2.5%, 5%, 7.5%, or 10% or more of a recyclable plastic material or less than 60%, 40%, 20% (by weight) or a range of any of the foregoing upper and lower weight percentages of recyclable plastic material.

The mixed waste stream may include at least 5%, 10%, 15%, 20%, 25%, or 30% or more of a recyclable mixed paper material or less than 90%, 80%, 70%, 60%, 50% or 40% (by weight) or a range of any of the foregoing upper and lower weight percentages of mixed paper material.

The mixed waste stream may include at least 15%, 25%, 35% or more, of a recyclable dry organic material and less than 90%, 80%, 70%, 60%, 50% or 40% (by weight) or a range of any of the foregoing upper and lower weight percentages of dry organic material. The mixed waste stream may include wet organic waste, dry organic waste, and/or inorganic waste. In one embodiment, the weight percentage of wet organic waste, dry organic waste, and inorganic waste in the mixed waste stream is each (independent of one another) at least 5%, at least 10%, at least 20%, at least 50%, or at least 75% (the sum of the three weight percentages not exceeding 100%).

In some cases, the higher concentrated recyclable mixed waste stream may be manually pre-sorted at the recycling facility to remove items that are difficult to shred or grind, obviously hazardous (e.g., structural metal, large rocks and the like), and/or that are particularly large (i.e., easily separated) and have a high recovery value (e.g., cardboard). The presorting may be performed on the facility tip floor before loading waste into the system or may be carried out by personnel on a dedicated presorting line. For example, waste may be metered onto a presorting conveyor where manual labor identifies items to be pre-sorted. Typically presorted items will include items that could damage or cause excessive wear to the shredder or grinder. Examples include automobile engine blocks, structural steel, tire rims, propane tanks, concrete blocks, large rocks, and the like. Hazardous waste is preferably removed before grinding to avoid contamination with other materials in the mixed waste. Examples of obviously hazardous waste include containers of solvents and chemicals, paint cans, batteries, and the like.

Presorting can also be used to recover particularly large and valuable items that are easily picked from the mixed waste stream. Typically the recyclables recovered in the pre-sorting will be items that are several times larger than the burden depth of the process stream such that they are easily visible and efficiently removed manually. For example large cardboard boxes (e.g., corrugated containers), structural metal pieces, and electronic waste (e.g., eWaste) can be recovered in presorting. The percentage of materials in the mixed waste stream described above refer to percentage of the waste stream immediately before it undergoes comminution and/or sizing (i.e., after presort).

Those skilled in the art will recognize that the composition of solid waste streams varies substantially over short periods of time. Of all the variability found in mixed solid wastes, there are three constant characteristics in varying degrees or percentages; density, dimension (2-D or 3-D) and moisture content. This invention, in part, uses a variety of equipment that separates by size, density and dimension, and then directs material to equipment that separates or recovers by material type (e.g., resin type for plastic, ferrous metal, non-ferrous metals, glass, paper, etc.). For purposes of this invention, the percentage of a particular type of material within the waste stream can be calculated according to acceptable industry standards such as the 2011 Waste Disposal Guidelines published by the California Department of Resources Recycling and Recovery (Also known as "Cal-Recycle" and previously known as the California Integrated Waste Management Board), which is hereby incorporated by reference (available at www.calrecycle.ca.gov/wastechar/YourData.htm#Step1 and the links associated therewith). At a minimum sampling of a waste stream shall include analyzing samples of at least 200 lbs. and sampling on a plurality of different days, weeks, and/or months.

2. Comminution

The recyclable mixed solid waste is conveyed to a comminuting device such as grinder or shredder (step 104). Comminution (e.g., shredding or grinding) may be carried out to improve the efficiency of size separation and density separation. In one aspect, the conveyor in step 104 may include a metering system such as a metering wheel or other such material leveling or spreading device configured for controlling the flow and associated burden depth of waste such that a relatively constant and evenly dissipated amount of material is spread across the full width of the conveyor, at a consistent burden depth or height, and fed to the grinder or shredder over time (and optionally a pre-sort conveyor).

Shredded or ground waste will have a range of particle sizes. In one embodiment the comminuted waste stream has a upper cut of 24 inches or less, 20 inches or less, 18 inches or less, 16 inches or less, 14 inches or less, 12 inches or less, 10 inches less, or 8 inches or less and/or a bottom cut greater than 1 inch 2 inch, 4 inch, or 6 inch, or may have a distribution with an upper cut and lower cut of any of the foregoing upper and lower cuts for the comminuted waste. In one embodiment, the ratio of the upper cut to lower cut may be less than 8, 6, or 4.

The size distribution of any particular fractured material generally depends on its material properties. For example, some objects like shipping pallets or tires will be ground or shredded to relatively large particle sizes. In contrast, brittle materials like glass, which tend to shatter, and food waste, which tends to easily shred, will be quite small after comminution.

The shredder or grinder used to comminute the mixed waste stream may include one or more shafts that include a number of cutting heads that that can cut and/or shred incoming waste materials to a selected size. Waste materials may be ground or shredded by turning rotors mounted with cutting blades or knives against a rigid blade housing, they then drop through the grinder or shredder to the screen basket (circular punch plate or finned design screens). Materials having a ground cut size less than a selected size, drop through a screen and move onto the next step in the process. Objects that are too large to pass through the screen are typically recirculated repeatedly through the grinder or shredder until they are ground to a size that can pass through the screen.

A number of solid waste grinders or shredders available in the marketplace are either adapted or can be adapted for comminuting the initial solid waste stream. For example, Vecoplan, LLC of High Point, N.C. makes a number of solid waste shredders that can be incorporated into the system and used in the methods described herein.

Preferably, the comminuted waste from comminuting device is ground or shred to a size of less than 18 inches, 16 inches, 12 inches, 10 inches, or 8 inches and greater than 2 inches, 4 inches, 6 inches, 8 inches, 10 inches, or a range from any of the forgoing upper and lower cutoff sizes. Comminuting the mixed MSW prior to size separation and density separation will increase the separation efficiencies of the density separators.

To achieve the desired cutoffs, the shredder can be configured to have a shredder opening (i.e., the spacing between cutting surfaces) that allows properly sized material to pass through the shredder with minimal cutting of particles smaller than the lower cutoff size. Reducing the number of fines (particularly particles less than 1 or 2 inches) improves separation efficiency and recovery. In some embodiments, the shredder opening (i.e., the gap distance between cutting surfaces) is at least 6, 8, 10, 12, or 14 inches and/or less than 24, 22, 20, 18, or 16 inches, or within a range thereof.

3. Size Separation

The comminuted waste may be conveyed to a size separator that fractionates the mixed waste by size (step 108) to produce two or more sized waste stream (e.g., at least an over fraction and an under fraction).

The sizing may be carried out to produce sized waste streams with a particular desired particle size distribution to facilitate density separation and to produce intermediate streams enriched in particular recyclable materials. Those skilled in the art will recognize that the comminuted waste stream can be analyzed to determine size cutoffs in which the fractions of the stream separate different types of materials into different streams while concentrating similar types of waste into somewhat concentrated streams. In addition, the sized waste streams may be optimized for density separation by creating sized waste stream with a narrow distribution of particles.

In one embodiment, the sized waste streams may have a size distribution with a ratio of small particles to large particles of less than about 10 (i.e., the ratio of the upper cut-off to the lower cut-off has a ratio less than about 10), more preferably, less than about 8, 6, or 4. An under fraction from size separation may have a top size cut-off of less than about 6 inches, 5, inches, 4 inches, 3 inches, or two inches and greater than 0.5 inch, 1 inch, 2 inch, or 3 inch, or a range within any of the foregoing upper and lower values for the top size cut. The upper fraction may have an upper size cutoff less than 16, inches, 12 inches, 10 inches, 8, inches or six inches and a lower size cutoff greater than 2 inches, 4 inches, 6, inches, or 8 inches or a range within any of the foregoing upper and lower cutoffs.

Suitable examples of a size separator that can be used in the present method include a disc screen separator with rubber or steel discs, a finger screen separator, a trommel screen separator, a vibratory screen separator, a waterfall screen, oscillating screen, flower disc screens, and/or other size separators known in the art.

A disc screen employs a series of rolling shafts having a series of attached discs with spaces between the discs that objects can fall through. The rolling of the shafts creates a wavelike action that agitates the incoming material as it is conveyed forward. This agitation releases smaller materials through the screen openings and is accomplished without vibration or blinding. The disc screen design greatly reduces the possibility of jamming or seizing during operation. Trommels, vibratory, or finger screens, waterfall screens, oscillating screens, flower disc screens, and/or other size separators known in the art also accomplish the same type of size separation objective, while using somewhat different engineered designs. Various size separators useful in the invention are commercially available through many different manufacturers worldwide. For example, disc screens, trommel screens, vibratory screens and waterfall screens are available from Vecoplan, LLC of High Point, N.C.

4. Density Separation to Produce Intermediate Streams

One or more of the sized waste streams may be separated by density to produce intermediate waste streams that are individually enriched in one or more recyclable materials. Although not required, the density separation is preferably performed in a separate apparatus downstream from the size separator. Downstream density separation allows distinct density separators to be used on individual sized fractions, which allows the individual density separators to be configured for particular materials and streams. The density separator units may be calibrated to provide separation between particular materials in the mixed waste stream. Density separation can be used to separate different types of materials such as wet organics, dry organics, and inorganic materials, thereby enriching one or more particular intermediate streams in one or more different types of recyclable materials.

In recyclable mixed solid waste streams, the recyclable materials often exhibit densities within particular ranges. For example, Please provide values for different densities of materials in a single stream. Thus, by setting the density separators accordingly, the different recyclable materials can be separated based on density. While the foregoing densities are useful for many recyclable waste streams, those skilled in the art will recognize that the teachings provided herein can be used to analyze any waste mixed solid waste stream and determine density cutoffs that will generate intermediate waste streams enriched in recyclable materials.

In some embodiments, a series of density separators can be used to further fractionate the intermediate waste streams. In downstream density separators, the density cutoff is selected to fractionate either the lower or the upper fractions received from the upstream density separator. Additional size separation may also be carried out on density-separated streams. Size and density separation are carried out until the intermediate stream is sufficiently enriched and homogenous in a particular recyclable material to allow efficient extraction of the recyclable material using mechanized sorting equipment.

Figure 2:
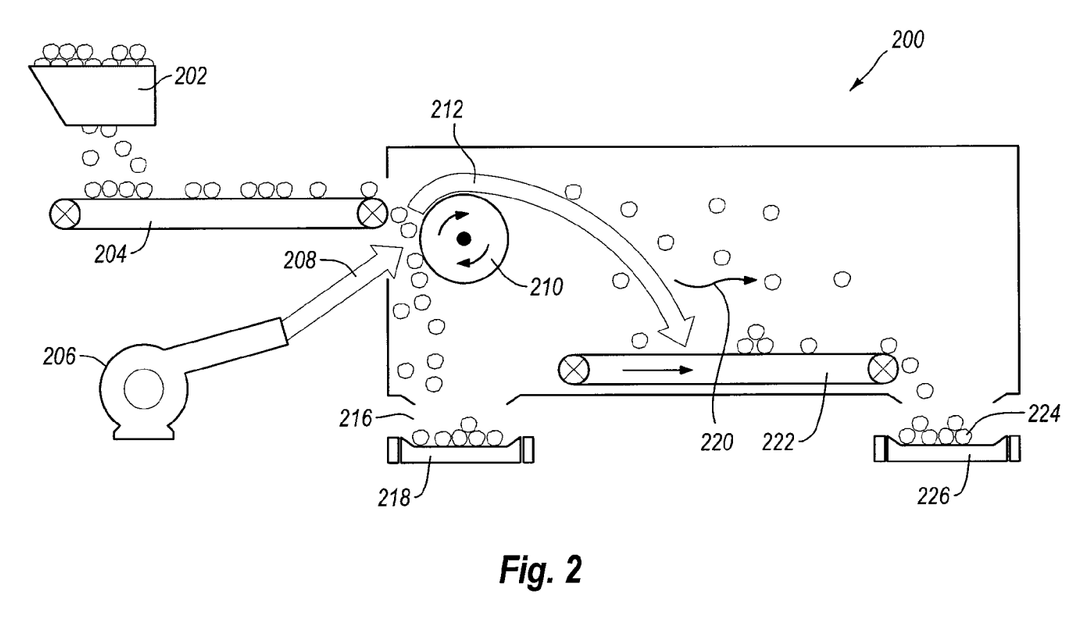
FIG. 2 illustrates a cut-away view of an air drum separator adapted for use in the system for separating solid waste, according to one embodiment of the present invention.

Referring now to FIG. 2, an example of a density separation unit that is adapted for separating municipal solid wastes by density is shown. FIG. 2 illustrates an air drum separator 200. The air drum separator 200 includes an input conveyor 204, a blower 206, a rotating drum 210, an output conveyor 222, a heavy fraction conveyor 218, and a light fraction conveyor 226. Mixed density wastes 202 are fed in on the input conveyor 204. As the waste material 202 is fed in, it drops off the end of the conveyor 202 where the wastes 202 encounter a stream of moving air 208 from the blower 206.

The heavy fraction 216 is separated from the mixed waste material 202 by virtue of being too heavy to be lifted by the airstream 208. The heavy fraction thus falls down in front of the drum 210 and falls on to the heavy fraction conveyor 218. In contrast, the lighter wastes are lifted up by the airstream 208 and carried over the rotating drum 210 and carried forward either by the airflow 220 or by the conveyor 222. The light fraction 224 drops off the end of conveyor 222 and onto the light fraction conveyor 226. These machines are highly adjustable to alter the weight density separation coefficient, as desired.

The relative density of the heavy fraction 216 and the light fractions 224 can be adjusted by controlling the airflow through the air drum separator 200. The velocity of the airflow and the volume of air passing through the drum separator 200 can be controlled either by increasing or decreasing the velocity of fan 206 or by opening or closing valve 212. In general, opening valve 212 and/or increasing the velocity of the fan 206 will carry heavier objects over the drum 210 such that the light fraction will have a higher average mass. Likewise, closing valve 212 or lowering the velocity of the fan 206 will cause the heavy fraction 216 to have a lower average mass and the light fraction 224 will have a lower average mass because only the lighter objects will be carried over the drum 210. Density separators suitable for use in the present invention include, but are not limited to air separators available from Westeria Fördertechnik GmbH, Ostbevern, Germany. While the particular example illustrated in FIG. 2 may be preferred in some embodiments, other separators can be used, including density separators that do not include drums (e.g., gravity/air separators, windshifters, air knives, etc.).

Density separators like those illustrated in FIG. 2 work best when the ratio between the largest and smallest objects being fed into the density separator is relatively narrow. Accordingly, it is preferable that the ratio of the largest to smallest objects that are fed into the density separators in the methods and systems described herein be about 12 to 1, about 10 to 1, about 8 to 1, 6 to 1, or about 4 to 1. Most preferably, the ratio of the largest to smallest objects that are fed into the density separators in the methods and systems described herein is about 6 to 1 (i.e., where the ratio of the top-cut to the bottom cut are in the foregoing ratios). In one embodiment, the methods and systems of the present invention are designed to provide waste materials to the density separators with particles size ratios within these approximate ranges.

5. Sorting Recyclable Materials from Intermediate Streams

The methods described herein also include extracting a plurality of recyclable materials from the intermediate waste stream using one or more mechanized sorting apparatuses. The particular mechanized sorting apparatus used depends on the particular recyclable material to be extracted.

In one embodiment, the intermediate waste stream may be enriched in metal, including a ferrous metal and/or a non-ferrous metal. To extract a non-ferrous metal an eddy current separator can be used. The eddy current separator can recover non-ferrous metals such as aluminum, brass and copper. Alternatively, or in addition, the metals may include ferrous metal and one or more magnetic separation devices can be positioned downstream of the density separator and configured to collect ferrous metal. Examples of magnetic separators include drum magnets, cross-belt magnets, head pulley magnets, and the like. Optical sorters, stainless steel sorters, infrared sorters, camera sorting machines, induction sorters, metal detection systems, X-ray sorters and the like can be used to separate different types of metals from one another, to produce a recyclable product. The recyclable metal products produced in the methods and systems described herein can be selected from the group including non-ferrous recyclable products such as aluminum, brass, and copper and/or other metals such as iron and/or stainless steel.

In one embodiment, the sorting apparatus may be a dimensional sorter such as a 2D-3D sorting apparatus. Examples of 2D-3D sorters include ballistic separators and/or screens configured to separate two-dimensional items from three-dimensional items. Two or more ballistic separators and/or screens can be used in series or parallel. The dimensional separators can be used to recover one or more materials that are comingled with another material having a similar density, but having substantially different dimensional properties (other than size). For example, in one embodiment, the 2D-3D separator may be used to separate rigid plastics (which tend to be three dimensional) from plastic film and/or paper, which are generally two-dimensional. Two dimensional plastics including films and rigid materials generally have a thickness less than ⅛ inch. Thus, the 2-dimensional materials are considered 2-dimensional because their thickness is much less than their length and width (e.g., 10 times or 100 times less). In addition or alternatively, a 2D-3D separator can be used to separate wood (which tends to be more three dimensional) from textiles (which tends to be more two dimensional).

Another mechanized sorting apparatus that can be used is an optical sorter. The optical sorter may be configured to separate film plastics from paper or separate different types of plastics from one another. For example an optical sorter can be configured to recover HDPE and/or PETE from an intermediate waste stream. One or more optical sorters may also be configured to recover #1-7 plastics and/or to remove and/or recover PVC plastics. The optical sorters may also be used to sort glass from an intermediate stream enriched in small inorganic particles. There are many types of optical sorter technologies, including, but not limited to; Near Infrared (NIR), camera color sorters, X-Ray, etc.

Optical sorters can scan the intermediate waste stream and determine whether the material being analyzed is a particular type of plastic, paper, or glass. The optical sorter upon detecting a particular material uses air directed through nozzles to eject the targeted/identified material to produce one or more recycled products such as recyclable PETE, recyclable HDPE, recyclable film plastic, recyclable #3-7 plastic and/or recyclable paper products.

Any optical sorter known in the art can be used. For example, in one embodiment the optical sorter can operate by scanning the intermediate waste stream in a free fall using a camera sensor. The camera sensor detects the material and then air jets may quickly eject the material while in free fall. There are also optical sorters that utilize near infrared, X-Ray and other scanning technologies to separate targeted materials from mixed streams. Any number of optical sorters can be used in series or parallel. Manufacturers of optical sorters include TiTech Pellenc, MSS, NRT and others.

The mechanical fractionating and sorting of the systems and methods described herein are particularly useful for extracting high value waste materials such as paper, plastic, and non-ferrous metals. In prior art systems these items have been particularly difficult (or practically impossible) to extract and/or sort from mixed solid waste. Conventional systems often cannot extract a significant portion of paper, plastics and/or non-ferrous metals because these materials cannot be extracted using a magnet. It is well-known to use magnets in traditional mixed waste processing systems. Magnets are sufficiently inexpensive and can be used in multiple locations within a system to make their use economically viable even when the magnet only extracts a small percentage of the ferrous material. However, recovering even ferrous metal from mixed solid waste is extremely difficult and inefficient due to the multitude and variety of materials found in mixed solid waste. The typical condition of mixed solid waste, as it is purged from the collection vehicles and/or transfer trailers, is such that a simple magnetic device would likely get a very small percentage, under 20%, of the available ferrous metal contained in the mixed solid waste stream and any metal recovered in such a fashion would be highly contaminated by other materials found in mixed solid waste that would be caught between the magnet's surface and the ferrous metal object that was attached (e.g., paper, plastic, etc.). In contrast, materials such as recyclable plastics, paper, and non-ferrous metals (e.g., brass) are often not extracted from mixed waste because the sorting equipment for these particular materials cannot handle the waste streams as configured in these systems. Despite the fact that non-ferrous metals and many sorted recyclable plastics typically have a value 5-15 times as much as ferrous metals, the industry usually only uses mechanical means to extract ferrous metal. Furthermore, recovery of these higher value recyclables such as paper, plastics and non-ferrous metals is plagued by the same usual conditions of mixed solid waste, in that such recyclables are so thoroughly mixed and hidden within the large variety of other non-recyclable items found the mixed waste stream (e.g., organics, inert materials, wood, textiles, fines, etc.). Additionally, a large portion of mixed solid waste, especially from residential collection routes and multi-family dwellings is deposited in plastic bags and discarded. Manually opening bags of trash that would somehow be picked from mixed solid waste and the subsequent sorting and recovery of any liberated recyclables, would be cost prohibitive in all but the most underdeveloped Countries. Finally, the highest valuable recyclable commodities/materials (e.g., PETE plastic, HDPE plastic, #3-7 plastic, aluminum cans, stainless steel, copper, brass, mixed non-ferrous metals) are generally found to be comprised of very small percentages of between 0.1% to 4%, on an individual material basis, relative to the overall mixed solid waste stream. Without most or all of the components described herein (e.g., preparation, metering, homogenizing and sorting), extracting these high value recyclable materials from materials with such low available percentages within the mixed waste stream is nearly impossible to do in an economically viable method.

6. Metering to Control Flow Rates and Burden Depth

Optionally, the methods can also include metering the sized waste streams and intermediate waste streams throughout the system to achieve a desired mass flow and burden depth. In one embodiment, the comminution apparatus, size separator, density separator, and/or mechanized sorters are separated by one or more conveyors that have variable speed controls. The variable speed control can be set to optimize the mass flow through the comminution apparatus, size separators, density separators, and/or mechanized sorters to optimize the quantity, purity, and/or value of the recyclable materials being recovered from the overall system by ensuring a metered and evenly distributed presentation of material to the individual devices. One or more sensors positioned upstream, downstream, or within the one or more of the components of the system can be used to monitor the separation efficiency, effectiveness, separation purity and/or rate of recovery of the recyclable materials. These values can then be used to optimize or maximize one or more parameters of the system such as recovery quantity, purity, and/or value of the recyclable materials recovered. Examples of sensors that can be used to control the flow rate of the waste streams include level sensors such as, but not limited to optical sensors and/or ultrasonic sensors that measure the height of material building up on a conveyor and/or upstream of a metering device and/or that measure open space on a belt. A belt, metering device, or other piece of equipment can be sped up or slowed down using the sensor data to ensure that a flow rate or desired burden depth is achieved on a belt or in or through a piece of processing equipment (e.g., size separators) and/or any other portion of the system described herein. Other sensors include mechanical switches that are physically actuated by the waste stream building up beyond a desired level (e.g., height), which actuates the mechanical switch to provide a signal that can then be used to regulate flow or burden depth. The speed of all metering equipment including; walking floors; conveyors; metering drums; shredders and grinders; air drum separators; screens of all types; vibratory feeders; metering feeder bins; load levelers; and other such devices can be controlled and adjusted via control systems and other devices in order to properly meter material through all portions of the invention. In some embodiments, the metering can be critical to obtain the desired high recovery and purity of recyclable materials from mixed solid waste.

The systems and methods can include using a plurality of sensors and metering the flow or depth burden of waste material conveyed to a plurality of sorting apparatuses. Although not required, it is preferable that each sorting apparatus have a sensor associated therewith and that the sensor be used to independently control metering of the two or more sorting apparatuses. For example, a level sensor or flow sensor can be positioned near an inlet of any combination of 3-dimensional sorter, optical sorter, eddy current separator, or the like.

7. Recovery Rates of Recyclable Materials

The present invention is particularly advantageous for recovering the majority of one or more different types of recyclable materials present in a mixed solid waste stream. The methods and systems are particularly useful where high value recyclables are present in very low concentrations. The systems and methods allow processing of mixed waste stream to metaphorically speaking "pick the needle out of the haystack." In one embodiment, the mixed waste stream may include at least one type of recoverable material at a concentration less than 15%, less than 10%, less than 5%, or even less than 1%, where the system or method is configured to recover at least 50%, at least 70%, at least 80%, or even at least 90% of the particular recoverable material.

In addition, the methods and systems as described herein may recover at least 25%, 50%, 75% or 90% of the recyclable metal in the waste stream (by weight) as recyclable metal product having a purity suitable for sale to a merchant of recyclable metals.

The process may recover at least 25%, 50%, 75% or 90% of the recyclable plastic materials in the mixed waste stream (by weight) to yield a recyclable plastic product having suitable purity for sale to a merchant of recyclable plastic products.

The process may recover at least 25%, 50%, 75% or 90% of the recyclable mixed paper products in the mixed waste stream (by weight) to yield a recyclable mixed paper product having a purity suitable for sale to a merchant of recyclable mixed paper.

The process may recover at least 25%, 50%, 75% or 90% of the recyclable dry organic materials to produce one or more (e.g., 1, 2, 3, 4, or more) recyclable dry organic products. The dry organic products may be selected from the group of mixed paper, 3-D plastics, film plastics, textiles, and wood.

The comminuting, size separation, and/or density separation may be used to produce homogeneous recycle streams that are sufficiently free from contamination to be recycled or used without further separation from other types of components present in the mixed waste and/or that are marketable as a recyclable product.

II. Systems for Separating Municipal Solid Waste

Figure 3:
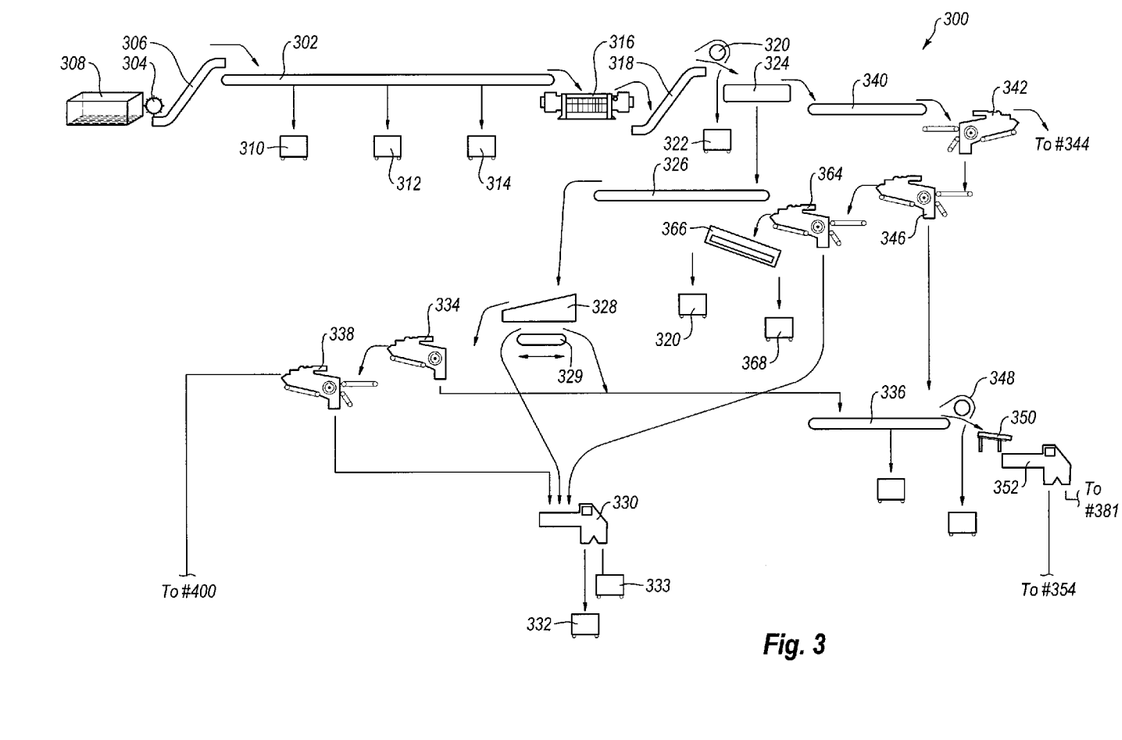
FIG. 3 is a flow diagram illustrating a system for separating recyclable mixed solid waste, according to yet another embodiment of the present invention.

FIG. 3 illustrates a system 300 that can be used to extract recyclable materials from a recyclable mixed solid waste stream. Portions of FIG. 3 describe streams that include handling a wet organic waste stream. Those skilled in the art will recognize that it is preferable that the amount of wet organics be negligible. Thus, in one embodiment, the portions of system 300 that handle the wet organics may not be necessary.

In FIG. 3, a mixed solid waste, such as source separated waste, dry commercial waste, and/or industrial waste is metered to a presorting conveyor 302. Metering may be carried out using a metering drum 304 and an infeed conveyor 306 that receives the mixed solid waste from a walking floor bunker feeder 308. Mixed solid waste on conveyor 302 is transferred to shredder 316. Mixed waste on conveyor 302 may be sorted manually. For example, manual laborers may pick large pieces of cardboard that are easily identifiable and selected out of large volumes of waste. Other materials may also be manually picked prior to shredding, including large pieces of treated wood, electronic waste (e.g., eWaste) or other obviously valuable items that can be efficiently hand-picked or otherwise conveniently pulled from conveyor 302. Picked cardboard may be collected and stored in bin 310 or baled and shipped to a paper mill. Other recyclable materials such as non-ferrous and ferrous metals and/or other sources of recyclable materials may be collected and stored in bin 312 or additional bins. In addition, hazardous waste may be collected and stored in bin 314 and subsequently disposed of in a proper manner. While presorting is not required, pre-sorting can be particularly useful to avoid contamination from hazardous wastes and potential damage to the shredder from heavy ferrous structural metal, concrete, large stones and other items.

Material from conveyor 302 that is not picked is delivered to shredder or grinder 316 which shreds or grinds the waste to a desired top cut as described above. The shredded material is moved on a conveyor 318 under a suspended magnet 320, which collects ferrous metal exposed in the waste stream and delivers it to ferrous metal storage 322. Due to burden depth, the magnet 320 is preferably a suspended drum magnet although other magnets may be used alone or in combination with a suspended drum magnet. Drum magnets are advantageous due to the burden depth prior to size sorting and their ability to capture ferrous metal in flight after being discharged from the conveyor 318 therefore minimizing most non-metallic cross contamination of the extracted ferrous metal.

Comminuted waste passing under magnet 320 is delivered to screens 324, which separates the comminuted waste stream by size to produce a first over fraction and a first under fraction. Screens 324 may include one screen or a plurality of similar and/or different sized screens and types of screens to produce one or more under fractions and one or more over fractions. The over fraction may be enriched in dry organics and under fraction may be enriched in wet organics.

The under fraction (i.e., fines) from screens 324 is conveyed on conveyor 326 to a second screen 328. The under fraction (i.e., fines) from second screen 328 may include wet organics and/or heavy inorganic materials, which may be processed using an eddy current separator 330 to recover non-ferrous metals. Conveyor 329 may be switchable to direct the fines from screen 328 to conveyor 336 if the inorganic fraction is dominant or to eddy current separator 330 if the wet organic is dominant. The wet organics from eddy current separator 330 can be collected and stored in bin 332 and the non-ferrous metals collected in bin 333.

The over fraction (i.e., coarse) from fine screen 328 may be further processed in density separator 334 to produce a light fraction having a small particle size and a heavy inorganic fraction. The heavy inorganic fraction can be conveyed to conveyor 336 and the light fraction can optionally be loaded in a second density separator 338 for additional separation into a light dry organic fraction and a heavy wet organic fraction.

With reference now to the first over fraction (from screen 324), the over fraction is conveyed on conveyor 340 to third density separator 342. Third density separator 342 can be configured to produce a light intermediate stream and a heavy intermediate stream. For example, third density separator 342 may be configured to cut in a range from 8-15 lbs. The light intermediate stream (i.e., less than 8-15 lbs.) may be enriched in dry plastics, paper, light ferrous metals (e.g., tin cans and tin can lids and other light ferrous metal items) and light non-ferrous metals (e.g., aluminum cans and other light non-ferrous items), which are transferred to conveyor 344.

The heavy intermediate waste stream from third density separator 342 (i.e., greater than 8-15 lbs.) may be enriched in heavy inorganic and heavy wet organic materials, which are delivered to fourth density separator 346 for additional separation. Fourth density separator 346 may cut in a range from 60-120 lbs. to produce a light intermediate stream, which is delivered to fifth density separator 364. Fourth density separator 346 may also produce a heavy intermediate stream (i.e., greater than 60-120 lbs.) enriched in heavy inorganic waste, which is delivered to conveyor 336. The intermediate stream on conveyor 336 may be sorted using a suspended drum magnet to collect ferrous metal and the remainder of the stream loaded on a vibratory feeder 350 that feeds an eddy current separator 352, which separates non-ferrous metal from the residue of inorganic waste. The non-ferrous metals may be further separated in infrared or other sorter 381 to extract copper and/or brass from other non-ferrous metals (i.e., to produce a mixed non-ferrous product stored in bin 396 and a brass and/or copper product stored in bin 398). The non-ferrous metals may be baled and/or bulk stored for shipment to mills.

The remainder of the waste stream exiting eddy current separator 352 is loaded on conveyor 354 and further processed using stainless steel sorter 356 and glass optical sorter 358. The intermediate stream may be sorted to extract stainless steel using stainless steel sorter 356 and/or sorted to extract glass using optical sorter 358. The sorting can produce recyclable stainless steel product and recyclable glass products, which can be stored in bins 362 and 360, respectively.

With reference again to fifth density separator 364, the light intermediate stream from separator 346 can be fractionated at a density of up to 15 lbs. for the wood and textiles to 40 lbs-60 lbs for the heavy wet organics to produce a light intermediate waste stream enriched in wood and textiles. The wood and textiles can be separated on 2D-3D sorter such as ballistic or angled disc screen separator 366 to yield-three dimensional recyclable wood product and a two-dimensional recyclable textile product, which can be collected in bins 368 and 320, respectively. The heavy stream from separator 364 may be enriched in heavy wet organics and can be delivered to eddy current separator 330 and/or joined with waste from separators 328 and 338.

With reference again to conveyor 344, the intermediate light stream from density separator 342 may be processed by suspension magnet 372 to yield a recyclable ferrous metal product collected in bin 373. The portion of intermediate stream that passes under magnet 372 and onto vibratory feeder 374 is loaded into a series of eddy current separators 376 and 378, which process the intermediate stream to recover non-ferrous metals. The non-ferrous metals may be collected on conveyor 377 and compacted into bales using baler 379 and then stored for shipment.

The dry organics not recovered in eddy current separators 376 and 378 provide an intermediate stream enriched in paper and plastics. The intermediate stream enriched in paper and plastics can be processed using a 2D-3D separator such as ballistic or angled disc screen separator 380. Ballistic or angled disc screen separator 380 separates plastic films and/or paper (i.e., 2D particles) from three-dimensional particles such as fractured rigid plastics. The 2D-3D separator can be placed before or after the eddy current separators 376 and 378.

The two-dimensional materials from ballistic or angled disc screen separator 380 can be delivered to conveyor 400 and the three-dimensional material can be further processed using optical sorters. The three-dimensional material can be processed in a first optical sorter 382 to produce an HDPE plastic product or PETE plastic product or #3-7 plastic product that is deposited onto quality control conveyor 383 and deposited into bin 384 or baled in baler 397. The intermediate stream can then be processed in a second optical sorter 388 to produce a PETE plastic product or HDPE plastic product or #3-7 plastic product that is deposited onto quality control conveyor 389 and deposited into bin 386 or baled in baler 398. Finally, the intermediate waste stream may be processed in a third optical sorter 390 to produce a recyclable #1-7 plastics product or HDPE plastic product or PETE plastic product that is deposited onto quality control conveyor 391 and deposited into bin 392 or baled in baler 399. The remainder of the waste stream from optical sorters 382, 388 and 390 may be a non-recyclable residual material or an improperly sorted recyclable material (e.g., PVC, stones, foam, fragment of an aluminum can, etc.), which may be collected on conveyor 393 and/or collected in bin 395 or transfer trailer prior to being disposed of in a landfill or further separated into potentially recyclable fractions of mixed inorganic material and transformed into various building materials that can potentially be marketed or used in construction applications. Quality control points can be placed between the optical sorters and bins as illustrated by quality control points 383, 389, and 391. The quality control points can be manual or mechanized inspection. In addition, the materials in bins 384, 386, and 392 may be baled in balers 397, 398, and 399, respectively.

With reference now to the two-dimensional material received on conveyor 400 from ballistic or angled disc screen separator 380, the two-dimensional material may be an intermediate stream enriched in film plastic and mixed paper. The two-dimensional materials may be loaded into a dosing bin or other type of metered storage and feeding device 402 and then metered to a plurality (e.g., 2-12) of optical sorters 404 that are configured to separate film plastics from paper. Optical sorters 404 produce a recyclable plastic film product 406 and a recyclable mixed paper product 408, either or both of which may be baled and/or stored for sale or shipment.

Wet organics produced in system 300 (e.g., wet organics in bin 332) can be further processed using one or more anaerobic digesters to produce a biogas that can be used as a fuel and/or a compost that can be used as a soil amendment or may be dried to make an organic fuel for combustion as a carbon fuel substitute. A description of suitable microbial digestion systems that can be used to digest the wet organic waste product produced in the current method can be found in U.S. Pat. No. 7,615,155 entitled "Methods for removal of non-digestible matter from an upflow anaerobic digester," U.S. Pat. No. 7,452,467 entitled "Induced sludge bed anaerobic reactor," U.S. Pat. No. 7,290,669 entitled "Upflow bioreactor having a septum and an auger and drive assembly," and U.S. Pat. No. 6,911,149 entitled "Induced sludge bed anaerobic reactor," and in U.S. Pat. Pub. No. 2008/0169231 entitled "Upflow bioreactor with septum and pressure release mechanism," the entireties of which are incorporated herein by reference.

Wet organics produced in system 300 (e.g., wet organics in bin 332) can be further processed, composted, provided to or sold to a processor as a highly concentrated mixed wet organics stream (e.g., food waste and yard waste and green waste).

The dry organic fuel products can, for example, be used alone or with another fuel in place of coal and other carbon based fuels in a number of industrial and energy generation processes. The dry organic fuel can also be used as a fuel to make synthesis gas through a variety of high temperature thermal conversion processes (e.g., gasification, plasma arc gasification and pyrolysis.) The dry organic material may also be stored on-site in either a bulk storage building with an automated filling and discharge system or storage silos with unloading devices.

Those skilled in the art will recognize that the recyclable products produced using the methods described herein are highly enriched in a particular type of recyclable material, which makes the one or more different products useful as a feed material in a recycling process. Nevertheless, the recyclable products are usually not 100% pure. While the recycling industry cannot use raw unprocessed refuse, most recycling systems can properly operate with small amounts of impurities. The systems and methods of the invention are used to produce recycled products having a suitable purity for use in the recycling industry.

While it may be desirable to recover value from essentially all the components of a solid waste stream, the present invention includes embodiments in which all or a portion of the wet organic fraction, dry organic fraction, or inorganic fraction is not fully separated into a recovered product. For example, in one embodiment all or a portion of the wet organic fraction, dry organic fraction, or inorganic fraction, whether mixed, properly separated, or improperly separated may simply be landfilled depending on the purity of the particular fraction and/or the market conditions for recycling the particular fraction (e.g., film may be landfilled).

III. Methods for Upgrading an Existing Recycling Facility

The present invention also relates to methods for upgrading an existing recycling facility to improve the efficiency of recovering recyclable products or materials and/or to allow the facility to handle different types of waste streams that are rich in recyclables.

The method includes providing a recycling facility that includes an established waste processing line for processing waste with a high percentage of recyclable materials. The established waste processing line may be configured and/or used for processing waste with less than 40%, 30%, 25%, 20 wt %, 15 wt %, 10 wt % or 5 wt % wet organics (based on a weekly average of the feed waste stream or other suitable technique for measuring the composition of the waste stream as used by those skilled in the art for the purpose of configuring a waste processing facility). Examples of existing recycling facilities include so called "single stream recycling facilities" and "materials recovery facilities (MRF)." Existing recycling facilities are typically configured to only handle certain kinds of waste streams. For example, a typical MRF can usually only handle commercial waste or residential source separated recyclables (e.g., Single Stream Recyclables), but not both.

The established waste processing line in the existing facility has a plurality of size separating apparatuses that fractionate waste by size. Examples of suitable equipment for separating based on size include screens such as, but not limited to, disc screen separator with rubber or steel discs, a finger screen separator, a trommel screen separator, a vibratory screen separator, a waterfall screen, oscillating screen, flower disc screens.

The established waste processing line includes equipment that has been designed, configured, and operated to process a particular type of waste and recyclable material. In particular, the established waste processing line has been configured for and operated to process a dry commercial solid waste stream, a dry industry solid waste stream, and/or a source separated residential recyclable material stream. The size separating apparatuses and sorting apparatuses are configured to handle particular types of material such as mixed paper or wood or textiles, glass, etc.

There are some examples of combination Single Stream MRFs and Commercial Dry Waste MRFs in the same buildings. In such cases, it is typical to have separate in-feed conveyor lines to elevated separate and distinct presort conveyors, with the smaller non-bulky cardboard materials separated by the Commercial MRF sent to the downstream paper and container sorting system on the Single Stream MRF system.

The established waste processing line also includes a plurality of sorting apparatuses that sort recyclable materials into recyclable products. The particular mechanized sorting apparatus used depends on the particular recyclable material to be extracted. Examples of mechanized sorting that can be carried out to produce recyclable products include eddy current separator; magnetic separators including drum magnets, cross-belt magnets, head pulley magnets, and the like; 2D-3D sorters, including ballistic and/or screens; optical sorters; stainless steel sorters; infrared sorters; camera sorting machines; induction sorters; metal detection systems; X-ray sorters and the like can be used to separate different types of materials from one another, to produce a recyclable product.

In a second step, the existing waste processing line is upgraded to include comminution device (e.g., shredder or grinder) upstream from the plurality of sorting apparatuses. In one embodiment, the shredder or grinder is placed upstream from all or a portion of the size separating devices and/or a density separator.

Optionally, the Upgrading an exiting waste processing facility to include a shredder or grinder and optionally one or more density separators can improve the efficiency of separation, thereby producing recycled products that are higher in quantity and value. In addition, the upgraded line can be used to process different types of materials that the established facility was not capable of handling. For example, where the equipment is configured to handle single stream recyclables from residential source separated recyclable materials the facility will typically not be able to handle large wood items such as 2×4s and pallets, textiles that would wrap around and seize disc streams, chains, cables and the like. These items would require costly hand sorting to remove. In addition, a portion of all described streams my come in sealed plastic bags. In those cases the bags would be opened by hand, or picked whole as garbage or sent to a mechanical bag opener for opening. In any of those cases, the cost of opening or removing the sealed plastic bags is costly. However, the upgraded processing line can grind the wood and separate it from other recyclable materials in the waste material. The upgraded processing line can also open the bags, without requiring manual removal. The upgraded facility can also recover a higher percentage of valuable recyclable materials out of the various waste and recyclable streams that would otherwise only be useful as a fuel or need to be landfilled.

While many of the methods and systems disclosed herein have been described as including density separation, those skilled in the art will recognize that in some embodiments, sufficient separation can be achieved without density separation, so long as the waste stream is comminuted and separated by size to produce intermediate streams enriched in at least one recoverable material.

In some embodiments, the existing waste processing facility may also be upgraded to newly include one or more sorting equipment for producing a recyclable material that is sortable due to the shredding that was previously not recoverable as a recyclable product. For example, an existing recycling facility may be upgraded to include any of the sorting equipment listed above, including but not limited to 2D-3D sorters to recover paper from film plastic.

U.S. Provisional application 61/417,216 filed Nov. 24, 2010, titled "Mechanized Separation of Mixed Solid Waste and Recovery of Recyclable Products" and U.S. patent application Ser. No. 13/221,637, filed Aug. 30, 2011 are both hereby incorporated herein by reference. The various features of these systems may be used in combination with the foregoing features described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method for sorting recyclable materials, comprising:
   providing a recyclable mixed solid waste stream that includes a plurality of mixed recyclable materials, wherein the source of the recyclable mixed solid waste stream is a dry commercial solid waste stream, a dry industrial solid waste stream, and/or a source separated residential recyclable material stream;
   comminuting the recyclable mixed solid waste;
   fractionating the comminuted recyclable mixed solid waste stream by size and density to produce a plurality of intermediate waste streams, wherein at least one of the mixed solid waste streams includes 3-dimensional plastic and 2-dimensional plastic or paper;
   individually sorting the plurality of intermediate waste streams using one or more sorting apparatuses to produce at least two recyclable products, wherein the sorting includes separating 3-dimensional plastic from the 2-dimensional plastic or paper;
   and recovering the at least two recyclable products, at least one of the recovered recyclable products being selected from the group consisting of paper and wood.

2. A method as in claim 1, wherein the comminuting is carried out using a shredder with a shredder opening in a range from 8-20 inches.

3. A method as in claim 1, wherein the recyclable mixed solid waste stream is provided with less than 40% wet organics.

4. A method as in claim 1, wherein a first intermediate waste stream is enriched in plastics, the sorting including separating 3-dimensional plastic from two dimensional plastics and recovering a 3-dimensional recyclable plastic product.

5. A method as in claim 4, wherein the first intermediate waste stream includes paper, the method further comprising sorting 2-dimensional plastic from paper to yield a paper product and a plastic film product.

6. A method as in claim 5, wherein the 2-dimensional plastic is sorted from the paper using one or more optical sorters.

7. A method as in claim 1, wherein a second intermediate waste stream is enriched in non-ferrous metals, the sorting of the second intermediate waste stream including separating non-ferrous metals from other materials using an eddy current separator and other non-ferrous metal recovery technologies and recovering a non-ferrous product.

8. A method as in claim 1, wherein the recyclable mixed solid waste stream includes 0.1%-10% by weight of metals selected from the group consisting of ferrous metal, non-ferrous metal, stainless steel, and combinations thereof.

9. A method as in claim 1, wherein the recyclable mixed solid waste stream includes from 1.0%-5% by weight of metals selected from the group consisting of ferrous metal, non-ferrous metal, stainless steel, and combinations thereof.

10. A method as in claim 1, wherein the recyclable mixed solid waste stream includes from 10%-90% by weight dry organics selected from mixed paper and plastic.

11. A method as in claim 1, wherein the recyclable mixed waste solid stream includes from 15%-60% by weight dry organics selected from mixed paper and plastic.

12. A method as in claim 1, wherein the, wherein the plurality of intermediate waste streams have a bottom cut size greater than 2 inches.

13. A method as in claim 1, wherein the recyclable mixed solid waste stream includes from 15%-60% by weight dry organics selected from mixed paper and plastic.

14. A method as in claim 1, wherein the recyclable mixed solid waste stream includes from 1.0%-5% by weight of metals selected from the group consisting of ferrous metal, non-ferrous metal, stainless steel, and combinations thereof.

15. A method for upgrading a solid waste recycling facility, comprising:
   providing a recycling facility that includes an established waste processing line including a plurality of size separating apparatuses that fractionate waste by size and a plurality of sorting apparatuses that sort recyclable materials into recyclable products, wherein the established waste processing line is configured to and has been operated to recover recyclable products from a dry commercial solid waste stream, a dry industry solid waste stream, and/or a source separated residential or commercial recyclable material stream;
   upgrading the established waste processing line to newly include a shredder or grinder upstream from the plurality of sorting apparatuses thereby yielding an upgraded waste processing line, wherein the upgraded waste processing line includes a 2D-3D sorter for separating 3-dimensional plastic from 2-dimensional plastic or paper; and processing a recyclable mixed solid waste stream on the upgraded waste processing line, wherein the recyclable mixed solid waste stream includes a dry commercial solid waste stream, a dry industry solid waste stream, and/or a source separated recyclable solid waste stream, the processing including shredding and/or grinding the recyclable mixed solid waste stream and using at least one of the sorting apparatuses to recover a recyclable product selected from the group consisting of paper and wood.

16. A method as in claim 15, further comprising upgrading the waste processing line to newly include a density separator downstream from the shredder or grinder and upstream from the plurality of sorting apparatuses.

17. A method as in claim 15, wherein the shredder is positioned in the upgraded waste processing line upstream from all the size separation apparatuses.

18. A method as in claim 15, further comprising upgrading the waste processing line to newly include a plurality of optical sorters configured to separate film plastic from paper.

19. A method as in claim 15, wherein the comminuting is carried out using a shredder with a shredder opening in a range from 8-20 inches.

20. A method as in claim 15, wherein the established waste processing line is configured to and has been operated to recover recyclable products from waste streams with less than 25% wet organics.

* * * * *